C. E. COOK.

SHOOTING GLASSES.

APPLICATION FILED JULY 27, 1910.

Reissued May 2, 1911.

13,231.

Witnesses
Geo. Wemich
M. B. Corwin

Inventor
Carroll E. Cook
by Benjamin T. Rosebrough
Atty

UNITED STATES PATENT OFFICE.

CARROLL EUGENE COOK, OF NEW LONDON, IOWA.

SHOOTING-GLASSES.

13,231. Specification of Reissued Letters Patent. Reissued May 2, 1911.

Original No. 946,596, dated January 18, 1910, Serial No. 510,791. Application for reissue filed July 27, 1910. Serial No. 574,042.

*To all whom it may concern:*

Be it known that I, CARROLL EUGENE COOK, a citizen of the United States, residing at New London, in the county of Henry and State of Iowa, have invented new and useful Shooting-Glasses, of which the following is a specification.

This invention has reference to shooting glasses and automobile goggles of the type shown in Letters Patent Number 916,109, granted to me March 23, 1909, and Number 936,987, granted October 12, 1909, the object of the present invention being to provide an improved hinge by which the lenses are connected and also to combine with the said hinge a nose piece of such a form that the lenses will be held in the proper position in front of the eyes. These objects are attained by the use of the device illustrated in the accompanying drawings, and the invention consists in certain novel features of the same which will be hereinafter first fully described and then particularly pointed out in the appended claims.

Figure 1:
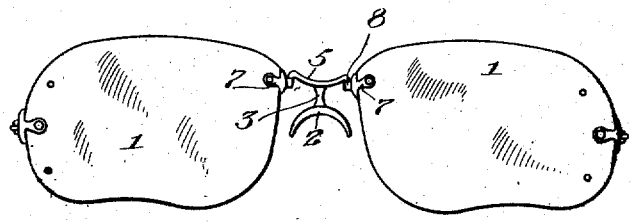
Figure 2:
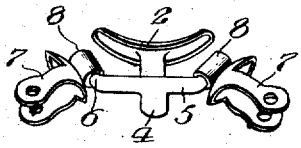
Figure 3:
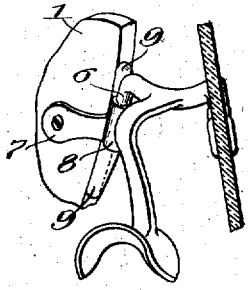
Figure 4:
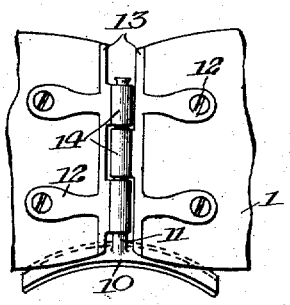
Figure 5:
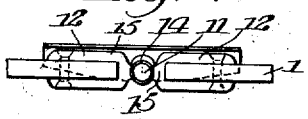

In the accompanying drawings, Figure 1 is a front view of a pair of shooting glasses embodying the preferred form of my present in-invention. Fig. 2 is an enlarged perspective view of the hinge connection between the lenses looking down upon the same. Fig. 3 is a perspective view of the same looking at the rear thereof. Fig. 4 is a front elevation of a modification. Fig. 5 is a plan view of the same, and Fig. 6 is an edge view thereof.

The lenses, 1, may be of any desired form, but are preferably of the shape shown in my aforesaid Letters Patent or my above-mentioned application for patent. In carrying out my present invention, I employ a nose piece or bridge, 2, which is in the form of a light metal arch adapted to rest easily on the nose of the wearer, and centrally from the said arch a post, 3, rises between the inner meeting edges of the lenses. In the form of the device shown in Figs. 1, 2 and 3, this post is curved inward and then outward so as to approximately correspond to the outline of the nose, as indicated at 4, and at the forwardly projecting end of the post is a cross bar, 5, from the extremities of which spindles, 6, depend. The lens holding clamps, 7, are secured to the meeting edges of the lenses and are provided with collars or sleeves, 8, which are rotatably mounted on the spindles and are also provided with upstanding projections, 9, which are adapted when the lenses are swung toward the post, 3, to engage against the cross bar, 6, and thereby limit the swinging movement of the lenses so as to prevent the same being carried against each other and thereby broken. The projections, 9, furthermore, serve to reinforce the connections between the lens and the securing clamp so as to prevent breakage of either part. It will be understood, of course, that the ends of the spindles are upset after the sleeves have been placed thereon so that the dropping of the sleeves from the spindles and the consequent loss of the lenses will be prevented. The bridge or nose piece is placed at a proper angle to the plane of the lenses to rest comfortably on the bridge of the nose and at the same time hold the lenses in proper position in front of the eyes of the user. The lenses are prevented from swinging out of place while in use by the usual temples or hoods.

Figure 6:
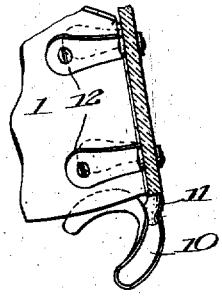

In the form of the device shown in Figs. 4, 5 and 6 the nose piece or bridge 10 is of the same form as that shown in Figs. 1, 2 and 3, but the post, 11, rising from the bridge is straight except at its lower end immediately adjacent its junction with the arch of the bridge where it is slightly turned so that the major portion of the post will stand vertically when the device is in position on the wearer. In this form of the device, furthermore, the cross bar at the upper end of the post is dispensed with and the lens-holding clamps are fitted directly on the post so as to form a hinged connection between the lenses. Each of the lens-holding clamps comprises two pair of clamping arms, 12, a straight back or strip, 13, from which the said arms, 12, project, and a sleeve or sleeves, 14, formed on the side of the back opposite the clamping arms and adapted to be rotatably engaged over the post, 11. The lenses will thus be supported directly upon the bridge or nose piece, and may be swung to any desired angle to properly fit the eyes of the wearer, and in order to prevent the lenses being swung so close together as to come into contact and thereby clip their edges or otherwise damage the same, the clamping arms 12, are formed with shoulders, 15, which, when the lenses are swung toward each other, will come into contact and thereby limit the said swinging movement.

From the foregoing description, taken in connection with the accompanying drawings, it will be seen that I have provided a very simple construction whereby the lenses will be connected and will be comfortably supported upon the nose of the user. The provision of the post rising from the bridge permits the lenses to swing in either direction and a strong support and connection is provided while, in use, they will be held in the proper position in front of and at the proper distance from the eyes without their edges being in contact with the nose or the cheeks so that bruising or cutting of the skin will be avoided.

Having thus described my invention, what I claim is:

1. The combination with shooting glass lenses, of a nose piece, a supporting post rising therefrom and arranged between the inner edges of the lenses, and hinged members mounted on the post and secured to the lenses, said hinged members being constructed with stops to limit the movement of the lenses toward each other.

2. The combination of a nose piece, a post rising therefrom, a cross bar at the end of the said post, hinge members mounted on the ends of said cross bar and provided with projections adapted to impinge against said cross bar, and lenses carried by said hinge members.

3. The combination with shooting glass lenses of a nose piece, a supporting post rising therefrom and arranged between the inner edges of the lenses, members movably mounted upon said post, and means for securing said lenses carried by said members.

4. In an eye protector, the combination of a nose piece, a post rising therefrom, and lens-carrying members pivotally mounted on said post.

5. In an eye protector, the combination of a nose piece, a post rising therefrom, and lens-carrying members pivotally mounted on said post so as to bring the opposite edges of the lenses closely adjacent to said post.

In testimony that I claim the foregoing as my own, I have hereto affixed my signature in the presence of two witnesses.

CARROLL EUGENE COOK.

Witnesses:
G. J. ANDREWS,
E. C. MCMULLEN.

Copies of this patent may be obtained for five cents each, by addressing the "Commissioner of Patents, Washington, D. C."